United States Patent [19]

Mogamiya et al.

[11] Patent Number: 5,678,101
[45] Date of Patent: Oct. 14, 1997

[54] HOLDER ASSEMBLY FOR ELECTRO-DEVELOPING RECORDING MEDIA AND ELECTRO-DEVELOPING TYPE CAMERA WITH SUCH HOLDER ASSEMBLY

[75] Inventors: Makoto Mogamiya; Masato Okabe; Hironori Kamiyama; Osamu Shimizu; Yuudai Yamashita, all of Tokyo, Japan

[73] Assignees: Asahi Kogaku Kogyo Kabushiki Kaisha; Dai Nippon Printing Co., Ltd., both of Tokyo, Japan

[21] Appl. No.: 636,951

[22] Filed: Apr. 24, 1996

[30] Foreign Application Priority Data

Apr. 25, 1995 [JP] Japan ................................ 7-124407
Jul. 25, 1995 [JP] Japan ................................ 7-208502

[51] Int. Cl.$^6$ .............. G03B 17/48; H04N 9/07; H04N 5/225
[52] U.S. Cl. .............. 396/429; 348/336; 348/375; 358/906; 358/909.1
[58] Field of Search .............. 348/262–265, 348/336, 339, 374, 375, 47, 48; 354/3, 288; 396/535, 538, 429; 359/702; 358/906, 909.1

[56] References Cited

U.S. PATENT DOCUMENTS

| | | | |
|---|---|---|---|
| 4,126,456 | 11/1978 | Pole et al. | 96/1 |
| 4,249,328 | 2/1981 | Plumadore | 40/158 |
| 4,322,740 | 3/1982 | Takemoto et al. | 358/44 |
| 4,489,351 | 12/1984 | D'Alayer De Costemore D'Arc | 358/213 |
| 4,552,445 | 11/1985 | Mukai et al. | 354/406 |
| 4,591,901 | 5/1986 | Andrevski | 358/50 |
| 4,623,916 | 11/1986 | Levine | 358/50 |
| 4,652,926 | 3/1987 | Withers et al. | 358/213 |
| 4,693,548 | 9/1987 | Tsunoi | 350/96.13 |
| 4,835,563 | 5/1989 | Larish | 354/412 |
| 4,862,414 | 8/1989 | Kuehnle | 365/106 |
| 4,933,751 | 6/1990 | Shinonaga et al. | 358/55 |
| 5,179,478 | 1/1993 | Aoki | 360/35.1 |
| 5,191,408 | 3/1993 | Takanashi et al. | 358/49 |
| 5,206,731 | 4/1993 | Takaiwa et al. | 358/209 |
| 5,392,128 | 2/1995 | Sato | 358/335 |
| 5,418,564 | 5/1995 | Aoki et al. | 348/264 |
| 5,424,156 | 6/1995 | Aoki et al. | 430/59 |

FOREIGN PATENT DOCUMENTS

| | | |
|---|---|---|
| 0327236 | 1/1989 | European Pat. Off. . |
| 5-2280 | 1/1993 | Japan . |
| 5-165006 | 6/1993 | Japan . |
| 6-130347 | 5/1994 | Japan . |
| 7-13132 | 1/1995 | Japan . |

*Primary Examiner*—Safet Metjahic
*Assistant Examiner*—John Chizmar
*Attorney, Agent, or Firm*—Greenblum & Bernstein P.L.C.

[57] ABSTRACT

A holder assembly includes at least two holder members for holding electro-developing recording media, respectively, and a connecting member for connecting the holder members to each other through the intermediary thereof, and each of the holder members is hinged to the connecting member. An electro-developing type camera includes a photographing lens system for focusing a light beam derived from an object, and an optical separator for separating the light beam, passing through the photographing lens system, into at least two light beam components. The photographing lens system and the optical separator are constituted and arranged such that the light beam components are focused on different image planes, respectively. The holder assembly is shaped and positioned such that the electro-developing recording media are included in the different image planes, respectively. The holder assembly further includes a lock member detachably engaged with the holder members and the connecting member to lock them in alignment with each other.

20 Claims, 5 Drawing Sheets

HOLDER ASSEMBLY FOR ELECTRO-DEVELOPING RECORDING MEDIA AND ELECTRO-DEVELOPING TYPE CAMERA WITH SUCH HOLDER ASSEMBLY

BACKGROUND OF THE INVENTION

1. Field of the Invention

The present invention relates to a holder assembly for holding at least two electro-developing recording mediums in each of which an optical image obtained through a photographing lens system is electronically and directly recorded and developed as a visible image in very little time. Also, the present invention relates to an electro-developing type camera in which such a holder assembly is incorporated.

2. Description of the Related Art

Such an electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both the media being combined to face each other with a small gap therebetween. A camera using the electro-developing recording medium is already proposed, and is referred to as an electro-developing type camera hereinafter.

In the electro-developing type camera, a voltage is applied between the electrostatic information recording medium and the electric charge keeping medium, and an optical image is formed on the electrostatic information recording medium by a photographing lens system, during the application of the voltage. An electric charge distribution is produced over the electrostatic information recording medium in accordance with a light intensity distribution of the optical image formed thereon, so that the intensity of an electric field acts on the liquid crystal of the electric charge keeping medium in accordance with the electric charge distribution. Thus, an image derived from the optical image is reproduced in the electric charge keeping medium as a visible image. Namely, as soon as the optical image is formed on the electrostatic information recording medium, the image is developed in the electric charge keeping medium.

The developed image held in the electro-developing recording medium is electronically read by an image reader comprising a CCD line sensor, and the read image signals obtained from the CCD line sensor may be processed in various manners. For example, the read image signals may be stored in a second recording medium such as an IC memory card, a floppy disk, a hard disk or the like. Also, the read image signals may be processed so as to be reproduced by a printer or on a TV monitor.

In the electro-developing recording medium, an optical color image, per se, cannot be directly developed and recorded. Before an optical image obtained by the photographing lens system can be reproduced as a color image by a printer or on a TV monitor, a light beam passing through the photographing lens system and carrying the optical image must be separated by an optical separator into three primary color light beam components, for example, a red light beam component, a green light beam component, and a blue light beam component, such that the primary color light beam components are on three electro-developing recording media, respectively. Then, the color images are read by the CCD line sensor to produce the red image signals, the green image signals, and blue image signals, and these color image signals are processed so as to reproduce a color image by a printer or on a TV monitor.

Before the reading of the color images from the electro-developing recording media can be easily carried out, the electro-developing recording media should be held in a flat holder such that these media are arranged in a same plane perpendicular to an optical axis of the photographing lens system. However, the color light beam components separated by the optical separator cannot be focused on a same image plane because the color light beam components travel along different optical paths, respectively. In other words, it is necessary to provide two optical-path correction prisms in the two optical paths diverted from the main optical path defined by the photographing lens systems before the three primary color light beam components can be focused on the same image plane.

Nevertheless, the provision of the optical-path correction prisms is undesirable because the additional use of the optical-path correction prisms results in increasing the cost of the camera, and in deteriorating the resolution of a focused image obtained through the optical-path correction prisms.

SUMMARY OF THE INVENTION

Therefore, an object of the present invention is to provide a holder assembly for holding at least two electro-developing recording media, which is constituted such that the electro-developing recording media can be arranged in different image planes, respectively, and such that the electro-developing recording media can be lockedly arranged in alignment with each other in a same plane, as necessary.

Another object of the present invention is to provide an electro-developing type camera in which such a holder assembly as mentioned above is incorporated without using any optical-path correction prisms.

In accordance with an aspect of the present invention, there is provided a holder assembly comprising: at least two holder members for holding electro-developing recording media, respectively; a connecting member for connecting the holder members to each other through the intermediary thereof, each of the holder members being hinged to the connecting member; and a lock member detachably engaged with the holder members and the connecting member to lock them in alignment with each other. The lock member may be constituted as a member having projections protruding therefrom. In this case, the holder members and the connecting members each has a slot formed therein, and the projections of the lock member are arranged so as to be inserted into the slots of the aligned holder and connecting members. On the other hand, the lock member may comprise a tubular element having an elongated split longitudinally formed therein, and the tubular element receives a longitudinal edge of the aligned holder and connecting members through the elongated split thereof.

In accordance with another aspect of the present invention, there is provided a holder assembly comprising first, second, and third holder members for holding electro-developing recording media, respectively; a first connecting member for connecting the first and second holder members to each other through the intermediary thereof, each of the first and second holder members being hinged to the first connecting member; a second connecting member for connecting the second and third holder members to each other through the intermediary thereof, each of the second and third holder members being hinged to the second connecting member; and a lock member detachably engaged with the holder members and the connecting members to lock them in alignment with each other. The lock member can be constituted as a member having four projections protruding therefrom. In this case, the first and third holder members and the first and second connecting members each has a slot formed therein, and the projections of the lock member are arranged so as to be inserted into the slots of the aligned holder and connecting members. On the other hand, the lock member may comprise a tubular element having an elongated split longitudinally formed therein, and the tubular element receives a longitudinal edge of the aligned holder and connecting members through the elongated split thereof.

In accordance with yet another aspect of the present invention, there is provided an electro-developing type camera comprising: photographing means for focusing a light beam derived from an object; optical separation means for separating the light beam, passing through the photographing means, into at least two light beam components; the photographing means and the optical separation means being constituted and arranged such that the light beam components are focused on different image planes, respectively; and holder assembly means including at least two holder members for holding electro-developing recording media, respectively, and a connecting member for connecting the holder members to each other through the intermediary thereof, each of the holder members being hinged to the connecting member, the holder assembly means being shaped and positioned such that the electro-developing recording media are included in the different image planes, respectively.

In accordance with still yet another aspect of the present inventions there is provided an electro-developing type camera comprising: photographing means for focusing a light beam derived from an object; optical separation means for separating the light beam, passing through the photographing means, into three light beam components; the photographing means and the optical separation means being constituted and arranged such that the light beam components are focused on different image planes, respectively; and a holder assembly means including first, second, and third holder members for holding electro-developing recording media, respectively, a first connecting member for connecting the first and second holder members to each other through the intermediary thereof, and a second connecting member for connecting the second and third holder members to each other through the intermediary thereof, each of the first and second holder members being hinged to the first connecting member, each of the second and third holder members being hinged to the second connecting member, the holder assembly means being shaped and positioned such that the electro-developing recording media are included in the different image planes, respectively. The optical separation means may be constituted so as to separate the light beam into three primary color light beam components.

The image planes may be perpendicularly arranged with respect to an optical axis defined by the photographing means. In this case, the image planes, in which the electro-developing recording media held by the first and third holder members are included, are included in a same plane, but the image plane, in which the electro-developing recording medium held by the second holder member is included, is farther away from the photographing means than the image planes of the electro-developing recording media of the first and third holder members. When the optical separation means is constituted so as to separate the light beam into three primary color light beam components, these three primary color light beam components are focused on the different image planes by the photographing means, respectively.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
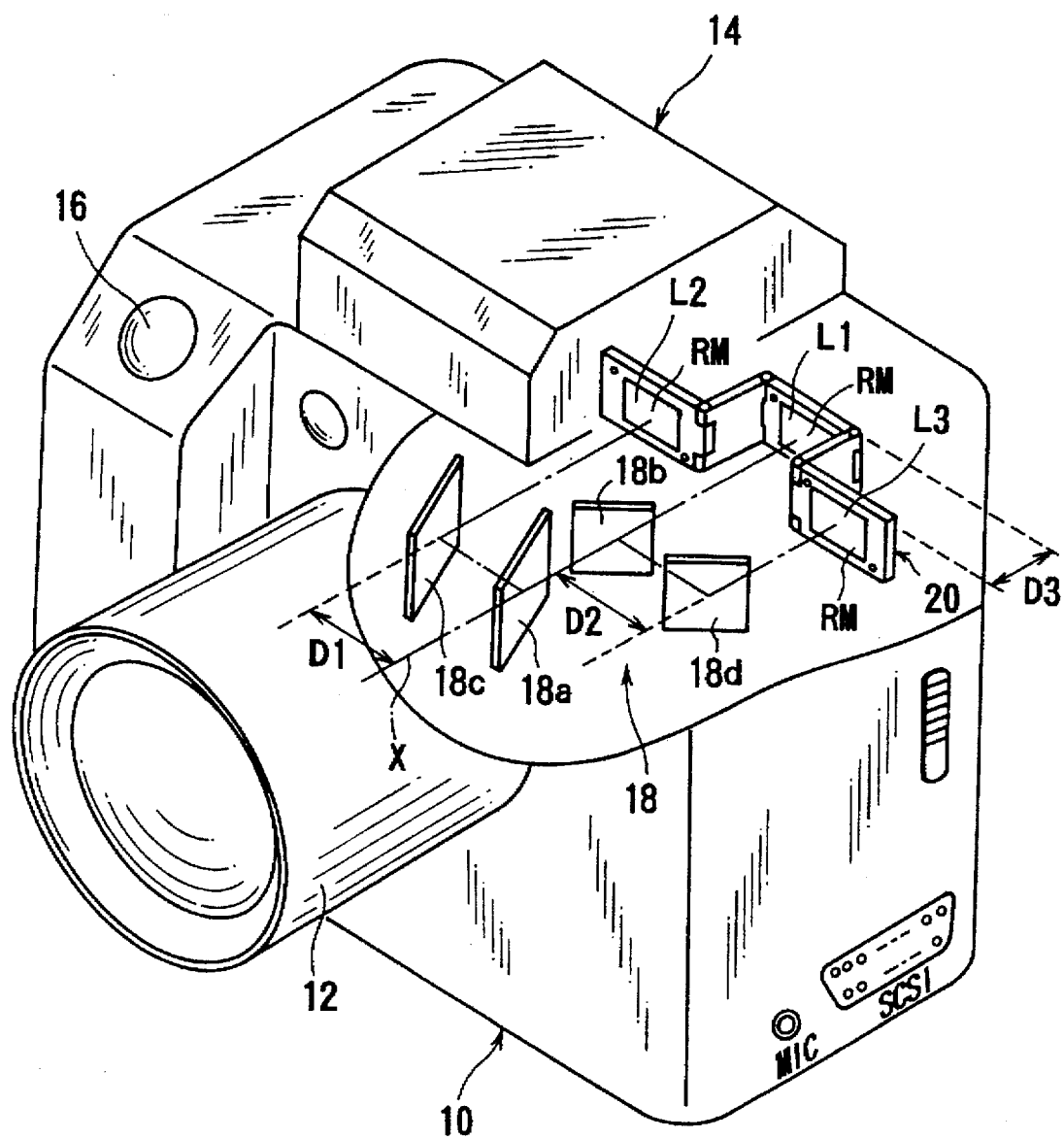
FIG. 1 is a schematic perspective view showing an electro-developing type camera according to the present invention.

FIG. 1 is an external view of an embodiment of an electro-developing camera according to the present invention, and a part of a camera body 10 thereof is cut off to partially show the interior thereof. The camera body 10 has a box-like configuration, and a photographing lens system 12 provided on approximately a center location of the front face thereof. A view finder 14 is provided at a center location of a top surface of the camera body 10, and a release switch 16 is provided at a side of the view finder 14.

An optical separator 18 is arranged in the camera body 10 at a back side of the photographing lens system 12, and includes two dichroic filters 18a and 18b, and two total reflecting mirrors 18c and 18d. The dichroic filter 18a is arranged so as to define an angle of 45 (135) degrees with an optical axis X defined by the photographing lens system 12, with the optical axis X being extended through a center of the dichroic filter 18a. The dichroic filter 18b is arranged so as to define an angle of 135 (45) degrees with respect to the optical axis X, and so as to define an angle of 90 degrees with respect to the dichroic filter 18a, with the optical axis X also being extended through a center of the dichroic filter 18b. The total reflecting mirrors 18c and 18d are arranged parallel with the dichroic filters 18a and 18b, respectively, on the lateral sides of the optical axis X of the photographing lens system 12.

The dichroic filter 18a is constituted so as to reflect only red light, and the dichroic filter 18b is constituted to reflect only blue light. Accordingly, when a light beam passing through the photographing lens system 12 and carrying an optical image photographed thereby is made incident upon the dichroic filter 18a, a red light beam component is separated from the light beam by the dichroic filter 18a. Namely, the red light beam component of the light beam is reflected by dichroic filter 18a toward the total reflecting mirror 18c, and the remaining light beam passes through the dichroic filter 18a. Then, when the remaining beam is made incident upon the dichroic filter 18b, a blue light beam component is separated from the remaining light beam. Namely, the blue light beam component is reflected by dichroic filter 18b toward the total reflecting mirror 18d, and the remaining light beam, i.e., the green light beam component, passes through the dichroic filter 18b.

Thus, the light beam passing through the photographing lens system 12 is separated by the optical separator 18 into three primary color light beam components, i.e., the red light beam component, the green light beam component, and the blue light beam component. The green light beam component passing through the dichroic filters 18a and 18b is focused on an image plane L1 due to the photographing lens system 12. Also, the red light beam component reflected by the dichroic filter 18a and then reflected by the total reflecting mirror 18c is focused on an image plane L2 due to the photographing lens system 12. The blue light beam component reflected by the dichroic filter 18b and then reflected by the total reflecting mirror 18d is focused on an image plane L3 due to the photographing lens system 12.

A distance measured from the rear end of the photographing lens system 12 to the image plane L1 (i.e., a distance along which the green light beam component travels along the optical axis X) is defined as a back focus distance of the photographing lens system 12, and this is true for the image planes L2, and L3. Namely, the optical paths, along which the respective red and blue light beam components travel from the rear end of the photographing lens system 12 to the image planes L2 and L3, must be equal to the back focus distance measured from the rear end of the photographing lens system 12 to the image plane L1. Accordingly, all of the image planes L1, L2, and L3 cannot be included in a common plane perpendicular to the optical axis X of the photographing lens system 12, as shown in FIG. 1. Namely, the image plane L1 is farther away from the photographing lens system than the image plane L2 and L3.

In this embodiment, since a distance D1 between the centers of the dichroic filter 18a and the total reflecting mirror 18c is equal to a distance D2 between the centers of the dichroic filter 18b and the total reflecting mirror 18d, the image planes L2 and L3 are included in a common plane perpendicular to the optical axis X of the photographing lens system 12, and a distance D3 between the image plane L1 and the image planes L2 and L3 is equal to the distances D1 and D2.

A holder assembly 20 according to the present invention is provided at the rear side of the optical separator 18, and holds three electro-developing recording media RM therein. The holder assembly 20 is foldable such that the electro-developing recording media RM are positioned and included in the image planes L1, L2, and L3, respectively.

Figure 2:
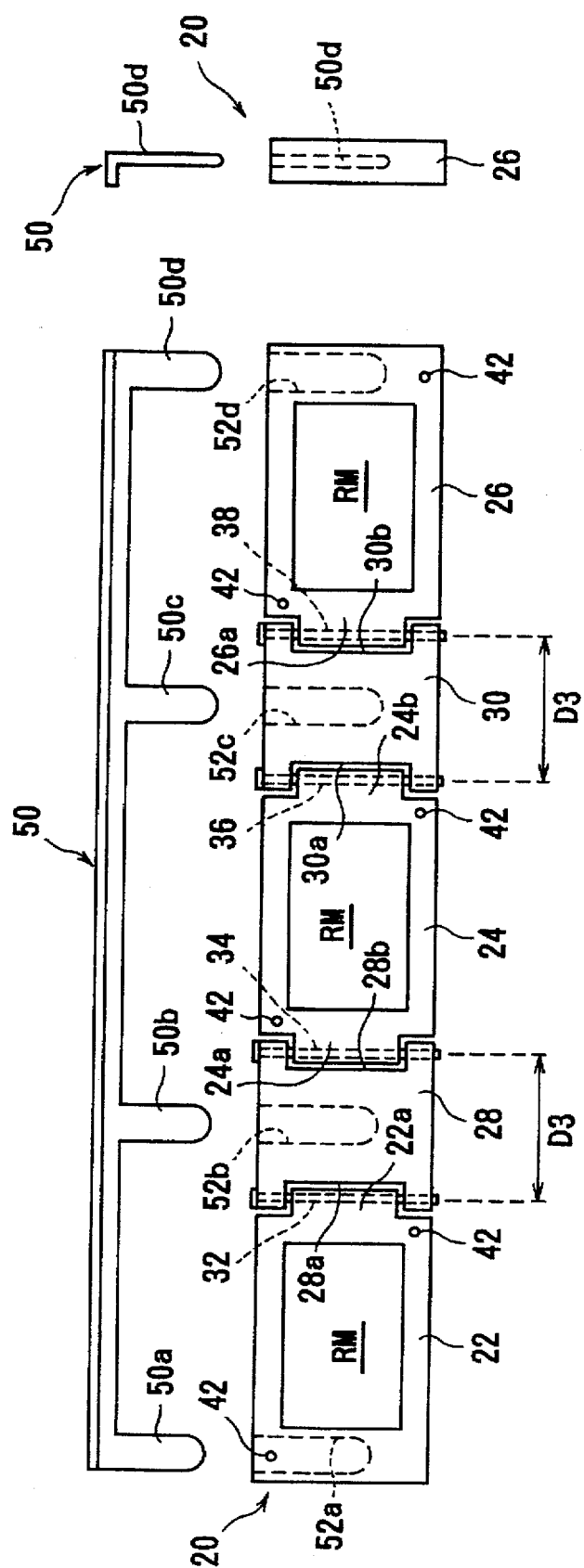
FIG. 2A is an elevation view of a holder assembly for holding electro-developing recording media according to the present invention.
FIG. 2B is a side view of FIG. 2A.

In particular, as shown in FIG. 2A, the holder assembly 20 includes first, and second, and third holder members 22, 24, and 26, and first and second connecting member 28 and 30. The three electro-developing recording media RM are held in and supported by the first, second, and third holder members 22, 24, and 26. The first and second holder members 22 and 24 are connected to each other through the intermediary of the first connecting member 28, and the first and second holder members 22 and 24 are hinged to the first connecting member 28. The second and third holder members 24 and 26 are connected to each other through the intermediary of the second connecting member 30, and the second and third holder members 24 and 26 are hinged to the second connecting member 30.

More particularly, the first holder member 22 has an ear portion 22a extended from a side thereof; the second holder member 24 has two ear portions 24a and 24b extended from the sides thereof; and the third holder member 26 has an ear portion 26a extended from a side thereof. The first connecting member 28 has two recesses 28a and 28b formed in the sides thereof, and the second connecting member 30 has two recesses 30a and 30b formed in the sides thereof. As is apparent from FIG. 2A, the ear portion 22a of the first holder member 22 is received in the side recess 28a of the first connecting member 28, and is hinged to the corresponding side of the first connecting member 28 by a pivot pin 32 extended therethrough) the ear portion 24a of the second holder member 24 is received in the side recess 28b of the first connection member 28, and is hinged to the corresponding side of the first connecting member 28 by a pivot pin 34 extended therethrough; the ear portion 24b of the second holder member 24 is received in the side recess 30a of the second connecting member 30, and is hinged to the corresponding side of the second connecting member 30 by a pivot pin 36 extended therethrough; and the ear portion 26a of the third holder member 26 is received in the side recess 30b of the second connecting member 30, and is hinged to the corresponding side of the second connecting member 30 by a pivot pin 38 extended therethrough.

As shown in FIG. 2A, a distance between the longitudinal axes of the pivot pins 32 and 34 and a distance between the longitudinal axes of the pivot pins 36 and 38 are each equal to the distance D3, and thus the holder assembly 20 can be folded and shaped such that the three electro-developing recording media RM held thereby are positioned and included in the image planes L1, L2, and L3, respectively, as shown in FIG. 1.

Figure 3:
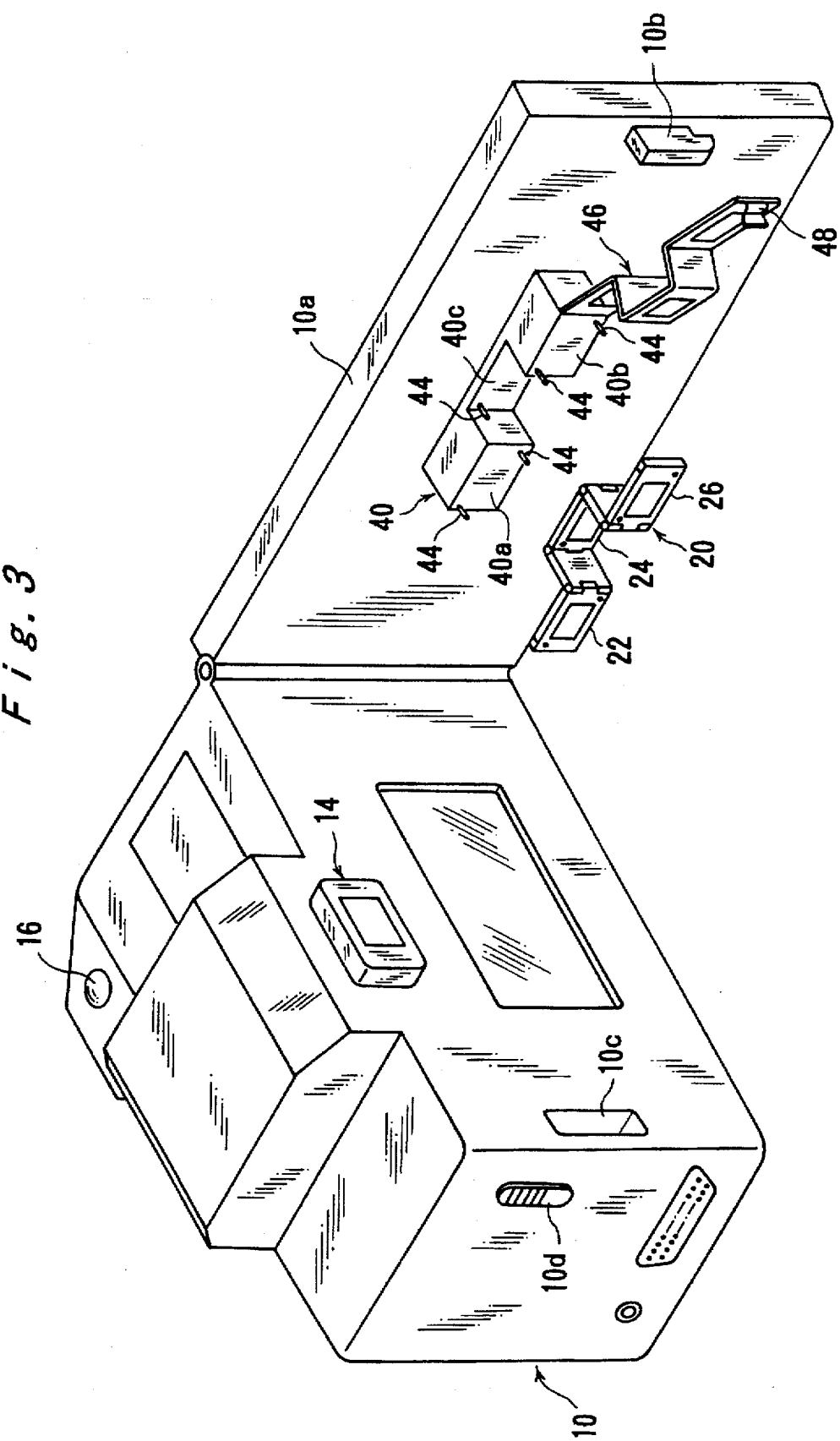
FIG. 3 is another schematic perspective view of the electro-developing type camera shown in FIG. 1.

As is apparent from FIG. 3, the holder assembly 20 is detachably attached to a mount 40 secured to an inner wall surface of a back-cover 10a of the camera body 10, and the mount 40 has two land portions 40a and 40b, and a central recess portion 40c therebetween. The holder assembly 20 must be folded and shaped so as to be adapted to an outer contour of the mount 40, as shown in FIG. 3, before the attachment of the holder assembly 20 to the mount 40 can be carried out. After the holder assembly 20 is folded and shaped, the holder members 22, 24, and 26 are placed on the land portion 40a, recess portion 40c, and land portion 40b of the mount 40, respectively.

To exactly position the holder assembly 20 with respect to the mount 40, each of the first, second, and third holder members 22, 24, and 26 has two positioning through-holes 42 formed therein, and each of the portions 40a, 40b, and 40c of the mount 40 has two positioning pins 44 projected therefrom. Preferably, the two positioning through-holes 42 of each holder member 22, 24, 26 are diagonally disposed, as best shown in FIG. 2A, and the two positioning pins 44 of each of portions 40a, 40b, 40c are correspondingly disposed. Each of the positioning pins 44 has a size so as to be fittedly inserted into the corresponding through-hole 42. Accordingly, whenever the holder assembly 20 is attached to the mount 40, the exact positioning of the holder assembly 20 with respect to the mount 40 can always be ensured.

As shown in FIG. 3, the mount 40 has a cover 46 hinged to the outer side edge of the land 40b thereof and shaped to be adapted to the outer contour of the mount 40, and the shaped cover 46 has a spring clip 48 fitted to an outer free side edge thereof. After the holder assembly 20 is attached to the mount 40, the shaped cover 46 is rotated toward the land portion 40a, and is then latched with the spring clip 48. Thus, the holder assembly 20 is covered with the shaped cover 46, whereby the secure and firm attachment of the holder assembly 20 to the mount 40 can be ensured. Note, as shown in FIG. 3, the shaped cover 46 has three rectangular openings formed therein, and these openings are arranged such that the electro-developing recording media RM are exposed therethrough when the holder assembly 20 is covered by the shaped cover 46.

When the back-cover 10a of the camera body 10 is closed, the holder assembly 20 occupies the position as shown in FIG. 1. Namely, the electro-developing recording media RM are positioned and included in the image planes L1, L2, and L3, respectively. Of course, the positioning of the electro-developing recording media RM in the image planes L1, L2, and L3 can be secured by the exact attachment of the holder assembly 20 to the mount 40.

As shown in FIG. 3, the back-cover 10a has a latch 10b securely fitted to an free end portion thereof. When the back-cover 10a is closed, the latch 10b is engaged with a lock mechanism ( not shown) provided in a slot 10c formed in the camera body 10a, whereby the positioning of the electro-developing recording media RM in the image planes L1, L2, and L3 is maintained as long as the back-cover 10a is closed. Notes the latch 10b is disengaged from the lock mechanism by manually operating a movable button 10d, whereby the back-cover 10a can be opened, as shown in FIG. 3.

When a photographing operation is carried out by depressing the release switch 16, an optical image obtained from the photographing lens system 12 is focused as a green optical image, a red optical image, and a blue optical image on the image planes L1, L2, and L3, respectively, and these color images are recorded and developed in the electro-developing recording media RM. Note, each of the developed images is achromatic, but it has the color information.

Before the optical image obtained from the photographing lens system 12, can be reproduced on a TV monitor (not shown), the developed images must be electronically read from the electro-developing recording media RM by, for example, scanning the media RM with a CCD image line sensor (not shown). To this end, the shaped holder assembly 20 removed from the mount 40 should be flattened such that the reading of the developed images with the CCD line sensor can be easily carried out. Namely, the firsts second and third holder members 22, 24, and 26 should be arranged and locked in alignment with each other in a same plane.

Accordingly, the holder assembly 20 is provided with a lock member 50, as shown in FIGS. 2A and 2B, and the lock member 50 has four projections 50a, 50b, 50c, and 50d protruding therefrom. On the other hand, the respective first holder member 22, first connecting member 28, second connecting member 30, and third holder member 26 have slots 52a, 52b, 52c, and 52d formed therein, and these slot 52a, 52b, 52c, and 52d are arranged so as to receive the projections 50a, 50b, 50c, and 50d provided that the holder assembly 20 is flattened as shown in FIGS. 2A and 2B. Of course, when the projections 50a, 50b, 50c, and 50d of the lock member 50 are inserted into the slot 52a, 52b, 52c, and 52d, respectively, the first, second and third holder members 22, 24, and 26 are locked in alignment with each other in the same plane.

Figure 4:
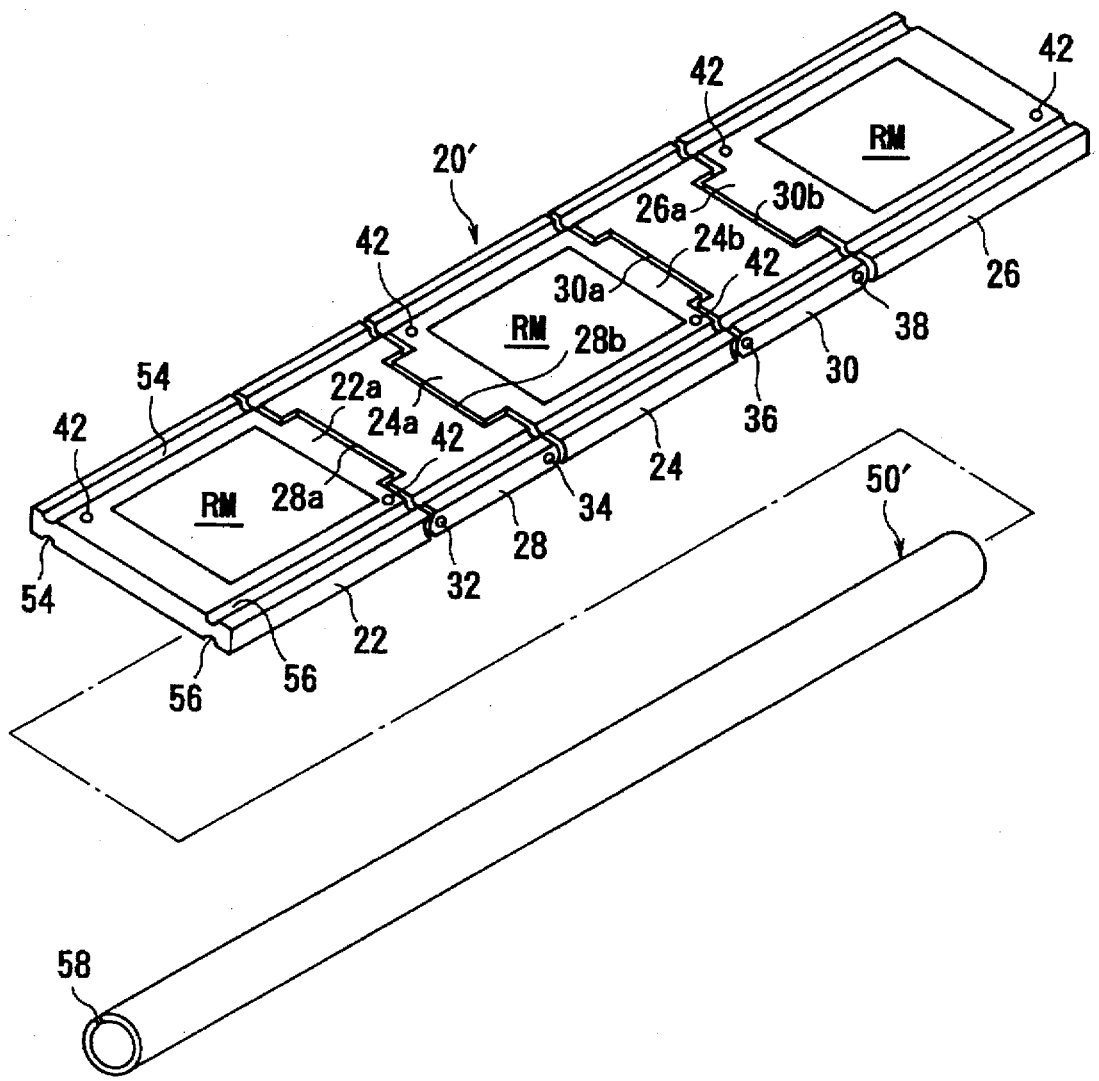
FIG. 4 is a schematic perspective view of another holder assembly for holding electro-developing recording media according to the present invention.

FIG. 4 shows a holder assembly 20' constituted in substantially the same manner as the holder assembly 20. In FIG. 3, the elements corresponding to those of FIGS. 2A and 2B are indicated by the same reference numerals. The holder assembly 20' can be folded and shaped so as to be attached to the mount 40 in the same manner as the holder assembly 20, and the firsts second and third holder members 22, 24, and 26 can be locked in alignment with each other by using a lock member 50'.

Figure 5:
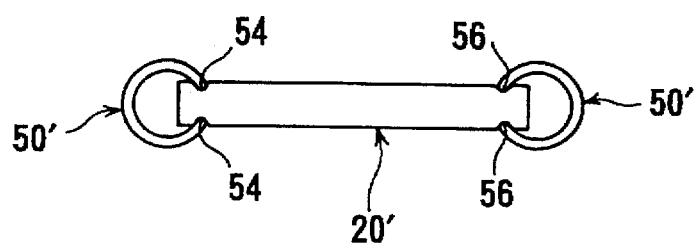
FIG. 5 is and end view of the holder assembly shown in FIG. 4.

In particular, the holder assembly 20' has two pairs of grooves 54; 54 and 56; 56 in the side faces thereof along the opposed side edges thereof, and these four grooves 54; 54 and 56; 56 are constituted by groove sections formed in the side faces of the members 22, 24, 26, 28 and 30 along the opposite side edges thereof, respectively. The lock member 50' comprises a tubular element having an elongated split 58 longitudinally formed therein, and the tubular element 50' receives a longitudinal edge of the aligned members 22, 24, 26, 28 and 30, such that the split edges rest in the grooves 54; 54 or 56; 56, whereby the firsts second and third holder members 22, 24, and 26 can be locked in alignment with each other. As shown in FIG. 5, the locking of the holder assembly may be carried out by using two lock members 50'.

Figure 6:
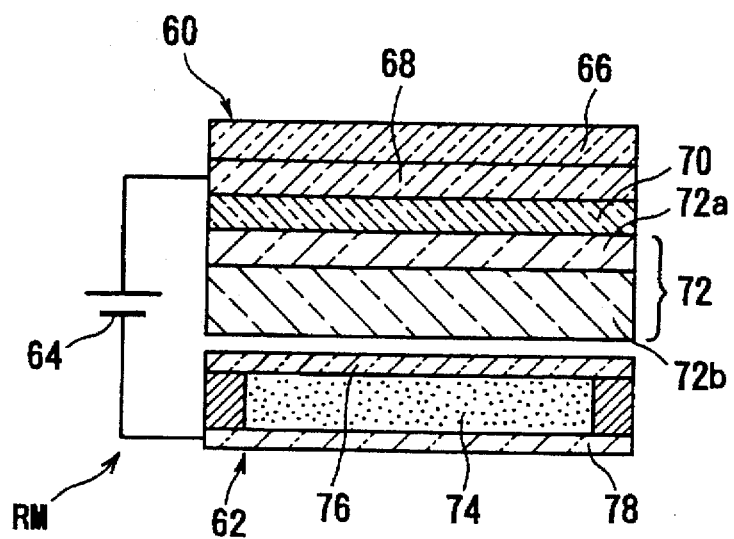
FIG. 6 is a cross-sectional view of an electro-developing recording medium.

FIG. 6 shows an example of a structure of the electro-developing recording medium RM, and this medium is identical with that disclosed in the above-mentioned Japanese Unexamined Patent Publication No. 5-2280 and U.S. Pat. No. 5,424,156, the disclosures of which are expressly incorporated herein by reference in their entirety. The electro-developing recording medium RM comprises an electrostatic information recording medium 60 and an electric charge keeping medium 62, and a voltage is applied therebetween by an electric power source 64, illustrated symbolically in FIG. 6, during the recording and development of an optical image therein.

The electrostatic information recording medium 60 is formed by laminating a base plate 66, an electrode layer 68, an inorganic oxide material layer 70 and a photoconducting layer 72, and the photoconducting layer 72 is formed by laminating an electric charge generating layer 72a and an electric charge transferring layer 72b. The electric charge keeping medium 62 is formed by confining liquid crystal 74 between a liquid crystal supporting plate 76 and a liquid crystal electrode layer 78. The electric charge transferring layer 72b of the photoconducting layer 72 and the liquid crystal supporting plate 76 of the electric charge keeping medium 62 face each other with a small gap therebetween. Note, as is apparent from FIG. 6, the whole structure of the electro-developing recording medium RM is transparent.

When an optical image is formed on the electrostatic information recording medium 60 by the photographing optical system 12 during the application of the voltage between the electrostatic information recording medium 60 and the electric charge keeping medium 62, an electric charge distribution is produced over the electrostatic information recording medium 60 in accordance with a light intensity distribution of the optical image formed thereon, so that the intensity of an electric field acts on the liquid crystal 74 of the electric charge keeping medium 62 in accordance with the electric charge distribution. Thus, an image derived from the optical image is reproduced in the liquid crystal 74 as a visible image. Namely, as soon as the optical image is formed on the electrostatic information recording medium 60, the image is developed in the electric charge keeping medium 62.

Preferably, the electric charge keeping medium 62 is constituted as a liquid crystal display using a memory type liquid crystal. In this case, the developed visible image can be kept therein even if the electric field is eliminated from the electro-developing recording medium RM. In the memory type liquid crystal display, the developed image can be erased by heating it to a given temperature, using, for example, an electric heater element. Thus, the same electro-developing recording medium RM can be repeatedly used for photographing.

Figure 7:
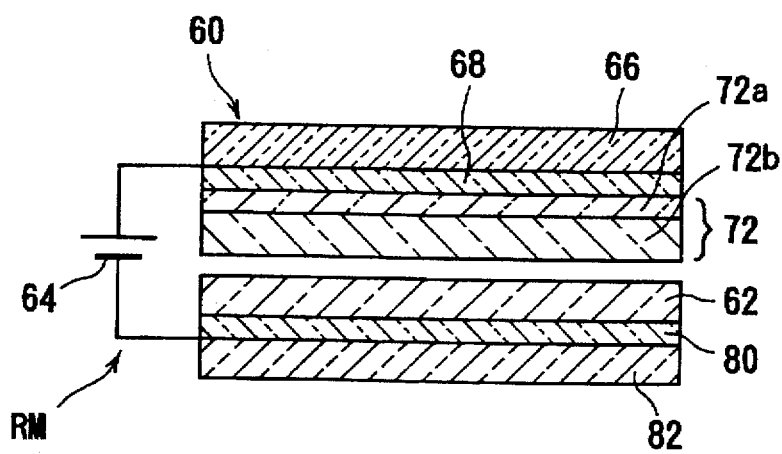
FIG. 7 is a cross-sectional view of another type of electro-developing recording medium.

FIG. 7 shows another example of a structure of the electro-developing recording medium RM, and this medium is identical with that disclosed in Japanese Unexamined Patent Publication No. 5-165005, the disclosure of which is expressly incorporated herein by reference in its entirety. The electrostatic information recording medium 60 is formed by laminating the base plate 66, the electrode layer 68 and the photoconducting layer 72, and the photoconducting layer 72 is formed by laminating the electric charge generating layer 72a and the electric charge transferring layer 72b. The electric charge keeping medium 62 comprises a liquid crystal display having a memory-type liquid crystal, and faces the photoconducting layer 72 with a small gap therebetween. An electrode layer 80 and a base plate 82 are laminated on a surface of the electric charge keeping medium 62, a surface of which is opposite to the electrostatic information recording medium 60. The other structural features are the same as those shown in FIG. 6.

Figure 8:
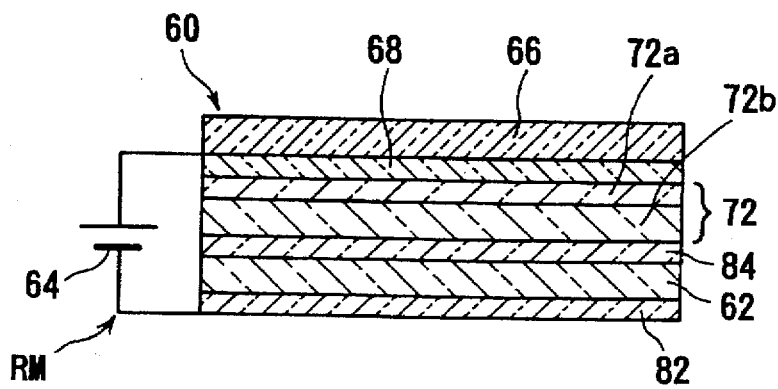
FIG. 8 is a cross-sectional view of yet another type of electro-developing recording medium.

FIG. 8 shows yet another example of a structure of the electro-developing recording medium RM which is identical with that disclosed in Japanese Unexamined Patent Publications No. 6-130347 and No. 7-13132, the disclosures of which are expressly incorporated herein by reference in their entirety. This electro-developing recording medium RM is a uni-body type. Namely, an insulating layer 84 is provided between the electric charge transferring layer 72b of the electrostatic information recording medium 60 and the electric charge keeping medium 62 which comprises a liquid crystal display using a memory-type liquid crystal, and an electrode layer 82 is laminated on a surface of the electric charge keeping medium 62 which is opposite to the electrostatic information recording medium 60. In short, in this example, no gap is formed between the electrostatic information recording medium 60 and the electric charge keeping medium 62. The other structural features are same as those shown in FIG. 6 or 7.

Finally, it will be understood by those skilled in the art that the foregoing description is of preferred embodiments of the present invention, and that various changes and modifications may be made to the present invention without departing from the spirit and scope thereof.

The present disclosure relates to subject matter contained in Japanese Patent Applications No. 7-124407 (filed on Apr. 25, 1995), and No. 7-208502 (filed on Jul. 25, 1995), which are expressly incorporated herein, by reference, in their entirety.

We claim:

1. A holder assembly comprising:
   at least two holder members for holding electro-developing recording media, respectively;
   a connecting member for connecting said holder members to each other, each of said holder member being hinged to said connecting member; and
   a lock member detachably engaged with said holder members and said connecting member to lock said holder members and said connecting member in alignment with each other.

2. A holder assembly as set forth in claim 1, wherein said lock member has projection protruding therefrom, and said holder members said connecting member each have a slot formed therein, said projections of said lock member being arranged so as to be inserted into said slots of said holder members and said connecting member.

3. A holder assembly as set forth in claim 1, wherein said lock member comprises a tubular element having an elongated split longitudinally formed therein, and said tubular element receives a longitudinal edge of said holder members and said connecting members through said elongated split.

4. A holder assembly comprising:
   first, second, and third holder members for holding electro-developing recording media, respectively;
   a first connecting member for connecting said first and second holder members to each other, each of said first and second holder members being hinged to said first connecting member;
   a second connecting member for connecting said second and third holder members to each other, each of said second and third members being hinged to said second connecting member; and
   a lock member detachably engaged with said first, second and third holder members and with said first and second connecting members to lock said first, second and third holder members and said first and second connecting members in alignment with each other.

5. A holder assembly as set forth in claim 4, wherein said lock member has four projections protruding therefrom, said first and third holder members and said first and second connecting members each have a slot formed therein, said projections of said lock member being positioned so as to be inserted into said slots of said first and third holder members and said first and second connecting members.

6. A holder assembly as set forth in claim 4, wherein said lock member comprises a tubular element having an elongated split longitudinally formed therein, and said tubular element receives a longitudinal edge of said first, second and third holder members and said first and second connecting members through said elongated split.

7. An electro-developing type camera comprising:
   photographing means for focusing a light beam derived from an object;
   optical separation means for separating the light beam, passing through said photographing means, into at least two light beam components;
   said photographing means and said optical separation means being constituted and arranged such that the light beam components are focused on different image planes, respectively; and
   holder assembly means including at least two holder members for holding electro-developing recording media, respectively, and a connecting member for connecting said holder members to each other, each of said holder members being hinged to said connecting member, said holder assembly means being shaped and positioned such that the electro-developing recording media are included in the different image planes, respectively.

8. An electro-developing type camera comprising:
   photographing means for focusing a light beam derived from an object;
   optical separation means for separating the light beam, passing through said photographing means, into three light beam components;
   said photographing means and said optical separation means being constituted and arranged such that the light beam components are focused on different image planes, respectively; and holder assembly means including first, second, and third holder members for holding electro-developing recording media, respectively, a first connecting member for connecting said first and second holder members to each other, and a second connecting member for connecting said second and third holder members to each other, each of said first and second holder members being hinged to said first connecting member, each of said second and third holder members being hinged to said second connecting member, said holder assembly means being shaped and positioned such that the electro-developing recording media are included in the different image planes, respectively.

9. An electro-developing type camera as set forth in claim 8, wherein said optical separation means seperates the light beam into three primary color light beam components.

10. An electro-developing type camera as set forth in claim 8, wherein said image planes are perpendicularly arranged with respect to an optical axis defined by said photographing means.

11. An electro-developing type camera as set forth in claim 10, wherein image planes, in which the electro-photographic recording media held by said first and third holder members are positioned, are a same plane, and an image plane, in which the electro-developing recording media held by said second holder member is positioned, is further away, along an optical axis, from said photographing means, than the image planes of the electro-developing recording media of said first and third holder members.

12. An electro-developing type camera as set forth in claim 11, wherein said optical separation means seperates the light beam into three primary color light beam components, and the three primary color light beam components are focused on the image planes by said photographing means, respectively.

13. An electro-developing type camera comprising:

a system that focuses a light beam from an object;

an optical separation assembly that separates the light beam, passing through said assembly, into three light beam components;

said assembly and said optical separation system being positioned such that the three light beam components are focused on different image planes; and a holder assembly that includes first, second and third holder members that hold electro-developing recording media, a first connecting member that connects said first and second holder members, and a second connecting member that connects said second and third holder members, said first and second holder members being pivotably coupled to said first connecting member, said second and third holder members being pivotably coupled to said second connecting member, said holder assembly being positioned such that the electro-developing recording media are positioned within the different image planes.

14. The electro-developing type camera according to claim 13, said optical separation assembly separates the light beam passing through said into three primary color light beam components.

15. The electro-developing type camera according to claim 13, wherein the image planes each extend perpendicularly with respect to an optical axis defined by said system.

16. The electro-developing type camera according to claim 15, wherein the image planes, in which the electro-developing recording media held by said first and third holder members are positioned, are within a same plane, and the image plane, in which the electro-developing recording media held by said second holder member is positioned, is further away, along an optical axis, from said assembly, than the image planes of the electro-developing recording media held by said first and third holder members.

17. The electro-developing type camera according to claim 16, said optical separation assembly separates the light beam into three primary color light beam components, and the three primary color light beam components are focused on the image planes by said assembly.

18. The electro-developing type camera according to claim 13, further including a locking member for detachably engaging said holder assembly to lock said first, second and third holder members and said first and second connecting members in alignment.

19. The electro-developing type camera according to claim 18, said lock member having projections, said first, second and third holder members and said first and second connecting members each having a slot, said projections of said locking member being insertable into said slots of said first, second and third holder members and said first and second connecting members.

20. The electro-developing type camera according to claim 18, said locking member comprising a tubular element having a longitudinally extending slit, said tubular member receiving a longitudinal edge of said first, second and third holder members and said first and second connecting members within said slit.

* * * * *